United States Patent [19]
Fielding

[11] 3,742,013
[45] June 26, 1973

[54] FLUORINATED COMPOUNDS CONTAINING FUNCTIONAL GROUPS

[75] Inventor: Harold Crosbie Fielding, Northwich, England

[73] Assignee: Imperial Chemical Industries Limited, London, England

[22] Filed: July 31, 1969

[21] Appl. No.: 870,788

Related U.S. Application Data

[62] Division of Ser. No. 656,682, July 28, 1967, Pat. No. 3,502,726.

[30] Foreign Application Priority Data

Aug. 24, 1967 Great Britain.................. 36,862/67

[52] U.S. Cl. ... 260/465.5 R, 260/566 D, 260/583 B, 260/583 GG
[51] Int. Cl. ................... C07c 121/02, C07c 121/42
[58] Field of Search...................... 260/465.7, 465.5, 260/583 GG, 583 B

[56] References Cited
UNITED STATES PATENTS

| | | | |
|---|---|---|---|
| 3,502,726 | 3/1970 | Fielding | 260/583 |
| 2,998,425 | 8/1961 | Dickinson, Jr. et al. | 260/465.5 R X |
| 3,121,108 | 2/1964 | Josey et al. | 260/465.5 R X |
| 3,475,481 | 10/1969 | Krespan | 260/465.5 |
| 3,194,840 | 7/1965 | Berry | 260/465.7 X |
| 3,234,267 | 2/1966 | Vogh | 260/465.7 |
| 3,326,976 | 6/1967 | Middleton | 260/583 GG |
| 3,546,276 | 12/1970 | Gale | 260/465.5 R X |

Primary Examiner—Joseph P. Brust
Attorney—Cushman, Darby & Cushman

[57] ABSTRACT

Derivatives of oligomers of tetrafluoroethylene and of hexafluoropropene, contain one or more

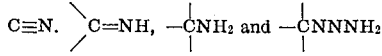

groups attached to the oligomer residue. Derivatives containing the first three of these groups are made by contacting an oligomer with anhydrous gaseous ammonia in a solvent medium or by heating with a concentrated aqueous solution of ammonia. Those containing MHNH₂ groups are made by reactions between oligomer and hydrazine. The derivatives may be converted into highly fluorinated nitriles which can be reduced to amines and quaternised with alkyl halides to yield cationic surfactants.

4 Claims, No Drawings

FLUORINATED COMPOUNDS CONTAINING FUNCTIONAL GROUPS

This is a division of application Ser. No. 656,682, filed July 28, 1967.

BACKGROUND OF THE INVENTION

1. Field of the Invention

Reactions of oligomers of tetrafluoroethylene and of hexafluoropropene with inorganic nucleophiles whereby one or more fluorine atoms are eliminated from the oligomer molecule.

2. Description of Prior Art

Nothing pertinent known.

SUMMARY OF THE INVENTION

Novel derivatives of oligomers of tetrafluoroethylene and of oligomers of hexafluoropropene whose molecules contain one or more $$-C{\equiv}N,\ \ \diagdown C{=}NH,\ -\overset{|}{C}NH_2,\ \text{and}\ -\overset{|}{C}NHNH_2$$

groups in which the carbon atoms are carbon atoms of the oligomers. Those derivatives containing -C = N.

$$\diagdown C{=}NH\ \text{or}\ -\overset{|}{C}NH_2$$

groups are made by reactions between oligomer and ammonia, whilst those containing $$-\overset{|}{C}NHNH_2$$

groups arise from reactions of oligomer with hydrazine.

This invention relates to highly fluorinated compounds containing functional groups, particularly to nitrogen-containing compounds derived from oligomers of tetrafluoroethylene and of hexafluoropropene.

Oligomers of tetrafluoroethylene are for the purpose of this specification defined as branched chain internally unsaturated perfluoroolefins having the empirical formula $(C_2F_4)_n$ where $n$ is an integer greater than 3 and commonly from 4 to 7, though it can be greater. Likewise oligomers of hexafluoropropene are defined as branched-chain internally unsaturated perfluoroolefins having the empirical formula $(C_3F_6)_n$ where $n$ is 2 or 3. These oligomers can be made by heating respectively tetrafluoroethylene or hexafluoropropene with an ionic catalyst, for example an alkali metal halide, in a polar organic solvent, for example dimethylformamide.

Some of the fluorine atoms in an oligomer molecule can be removed by reactions between the oligomer and compounds containing reactive atoms, for example hydrogen or alkali metal atoms, whereby derivatives of the oligomer are formed. Those containing functional groups possess useful surface-active and other properties.

The present invention is concerned with novel oligomer derivatives made by reactions between oligomers and ammonia and between oligomers and hydrazine whereby fluorine from the oligomer and hydrogen from ammonia or hydrazine are eliminated as hydrogen fluoride and the oligomer residue and ammonia or hydrazine residues become linked through one or more nitrogen atoms. The courses of the reactions are not simple since fluorine atoms attached to more than one carbon atom of the oligomer can be eliminated, but it can be said that in general ammonia reacts with a $$-\overset{|}{C}F$$

group to introduce a $$-\overset{|}{C}-NH_2$$

group into the oligomer molecule; with a $$\diagdown CF_2$$

group to introduce a $$\diagdown C{=}NH$$

group and with a $-CF_3$ group to introduce a -C = N group. Hydrazine reacts in a similar manner with a $$-\overset{|}{C}F$$

group to introduce a $$-\overset{|}{C}-NH{\cdot}NH_2$$

group into the oligomer molecule.

Thus the invention in its general form provides highly fluorinated nitrogen-containing derivatives of oligomers of tetrafluoroethylene and of oligomers of hexafluoropropene whose molecules contain at least one of the groups $$C{\equiv}N,\ \diagdown C{=}NH,\ -\overset{|}{C}NH_2\ \text{and}\ -\overset{|}{C}NNNH_2$$

in which the carbon atoms are carbon atoms of the oligomer molecule.

In a particular form the invention provides highly fluorinated nitrogen-containing derivatives of tetrafluoroethylene tetramer $(C_2F_4)_4$ having respectively the empirical formulae $C_8F_{14}NH$ and $C_8F_{12}(NH)_2$, and the highly fluorinated nitrogen-containing derivative of tetrafluoroethylene pentamer $(C_2F_4)_5$ having the empirical formula $C_9F_{16}(NH_2)(CN)$.

The derivatives obtained by reactions of ammonia with the tetramer and pentamer of tetrafluoroethylene and of hydrazine with the pentamer are well characterised and their properties are consistent with the structural formulae described hereinafter. Reactions of ammonia and hydrazine with higher oligomers of tetrafluoroethylene, for example the hexamer, and of ammonia with the isomeric trimers of hexafluoropropene give rise to derivatives containing one or more of the groups -CN.

$$\diagdown CNH,\ -\overset{|}{C}NH_2\ \text{and}\ -\overset{|}{C}NH{\cdot}NH_2$$

but it is not yet possible to say anything more specific about their molecular structures.

The reactions between oligomers and ammonia can conveniently be carried out at 10° C to 30° C by bubbling gaseous ammonia into a stirred solution of the oligomer in an inert solvent, for example ether or 1,1,2-trifluoro-1,2,2-trichloroethane or in a diluent such as benzene in which the product dissolves. The reactions can also be carried out in the absence of a solvent, but precipitated solids may then make stirring difficult. The reactions can also be carried out at higher temperatures, for example 50° C to 100° C, under moderate pressure if desired, using a strong aqueous solution of ammonia and stirring vigorously.

The derivatives obtained by reactions of oligomers with ammonia and hydrazine are useful intermediates. For example they can be hydrolysed with aqueous solutions of caustic soda or caustic potash to give highly fluorinated nitriles that can be reduced to amines and quaternised, for example with methyl iodide, to give cationic surfaceactive agents.

EXAMPLE 1

Anhydrous ammonia was bubbled through a stirred solution of tetrafluoroethylene pentamer (100 g.) in ether (1 litre) at room temperature. When the reaction was complete the precipitated ammonium fluoride was filtered off and the ether solution evaporated to give an off white solid. Recrystallisation from benzene gave plates having a m.pt. 69° C in a yield of 80 g.
Found by analysis C, 26.1 H, 0.8: F, 67.4, N, 6.4 percent by weight.
$C_{10}F_{16}H_2N_2$ requires C, 26.4; H, 0.4; F, 67.0; N, 6.2 percent by weight.
The infra-red spectra showed the presence of both $-C \equiv N$ and $-NH_2$ groups and mass-spectrographic analysis indicated a molecular formula $C_{10}F_{16}H_2N_2$. $F^{19}$ nuclear magnetic resonance measurements showed two equivalent $C_2F_5$ groups and two different $CF_3$ groups. This evidence taken as a whole is consistent with the structural formula $(C_2F_5)_2(CF_3)C.C(CN)=C(CF_3)NH_2$.

EXAMPLE 2

The experiment described in Example 1 was repeated with 100 g. of tetrafluoroethylene tetramer, $(C_2F_4)_4$, in place of pentamer. Evaporation of the ether solution gave a viscous liquid from which preparative gas-liquid chromatography isolated two main components in 30 percent and 40 percent by weight yields respectively.

The first component was shown by elementary analysis to have the empirical formula $C_8F_{14}NH$ and its mass spectrum was in agreement with this. $F^{19}$ nuclear magnetic resonance measurements were consistent with the structural formula

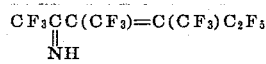

The second component was shown by elementary analysis and mass-spectrographic analysis to have the empirical formula $C_8F_{12}N_2H_2$. $F^{19}$ nuclear magnetic resonance measurements were consistent with the structural formula

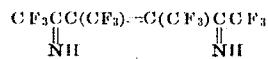

EXAMPLE 3

Anhydrous ammonia was bubbled through a solution of 50 g. tetrafluoroethylene hexamer, $(C_2F_4)_6$ mixed isomers, in 100 mls of 1,1,2-trifluoro-1,2,2-trichloroethane at room temperature. When the reaction was complete the precipitated ammonium fluoride was filtered off and the solution evaporated to dryness to give a white solid of indefinite melting point. Its infra red spectra indicated the presence of a $-C \equiv N$ and an $NH_2$ group.

EXAMPLE 4

Tetrafluoroethylene pentamer (50 g.) and aqueous ammonia (50 mls of solution of specific gravity 0.880) were heated together under reflux at 80° C with vigorous stirring for two hours. The reaction mixture was cooled and filtered to give 15 g. of a white solid which on recrystallisation from benzene melted at 68° C–69° C and was identified as the same compound as that described in Example 1.

EXAMPLE 5

Tetrafluoroethylene pentamer, $(C_2F_4)_5$, (12 g.) was added to a stirred solution of hydrazine hydrate (42 g.) in water (30 mls)/ethanol (90 mls). An exothermic reaction set in immediately and the reaction mixture turned green. It was left under reflux for two hours after which 100 mls water was added and the mixture extracted with ether (4 × 75 mls). The ether extract was dried over anhydrous magnesium sulphate and distilled to remove ether and ethanol. The residue solidified on cooling and on recrystallisation from benzene gave 1.5 g. (12 percent yield) of white crystals melting at 70° C–71° C.
Found by analysis : C, 24.9; H, 0.48; N, 6.4; F, 66.7 percent by weight.
$C_{10}F_{19}N_2H_3$ requires : C, 23.4; H, 0.59; N, 5.45; F, 70.5 percent by weight.
The mass spectrum agreed with this empirical formula and $F^{19}$ nuclear magnetic resonance measurements were consistent with the structural formula $(C_2F_5)_2(CF_3)C.C(CF_3)=C(CF_3)NHNH_2$.

EXAMPLE 6

Anhydrous ammonia was bubbled through a solution of 9 g. of perfluoro-2,4,5-trimethylhexene-2 (one of the three isomeric trimers of hexafluoropropene) in dry ether (50 mls) for 5 hours at room temperature. Precipitated ammonium fluoride was then removed and the ether distilled away to give a solid which after recrystallisation from benzene melted at 69° C–70° C. The infra-red spectra of the compound showed it to contain a $-C \equiv N$ and an $NH_2$ group.

EXAMPLE 7

The reaction described in Example 6 was carried out with another of the three isomeric trimers of hexafluoropropene, namely perfluoro-2,3,5-trimethylhexene-2, at a temperature of 45° C. The product after recrystallisation from toluene/ether melted at 125° C–127° C with some decomposition. Its infra-red spectra showed it to contain a $-C \equiv N$, and an $=NH$ group.

What we claim is:
1. A highly fluorinated nitrogen-containing derivative of tetrafluoroethylene pentamer having the formula $(C_2F_5)_2 (CF_3)C.C(CN) = C(CF_3)NH_2$.
2. A process for making branch chain internally unsaturated compounds consisting essentially of reacting at a temperature of 10° to 100° C anhydrous ammonia with an oligomer of tetrafluoroethylene having the empirical formula $(C_2F_4)_n$ where $n$ is 3 to 7 or hexafluoropropene having the empirical formula $(C_3F_6)_n$ where $n$ is 2 or 3.
3. The process of claim 2 in which the oligomers are selected from the group consisting of the tetramer $C_8F_{16}$, pentamer $C_{10}F_{20}$ and the hexamers $C_{12}F_{24}$ of tetrafluoroethylene and the trimers $C_9F_{18}$ of hexafluoropropene.
4. A process according to claim 2 in which the reaction is carried out at a temperature of 10° C to 30° C.

* * * * *